United States Patent Office 2,946,552
Patented July 26, 1960

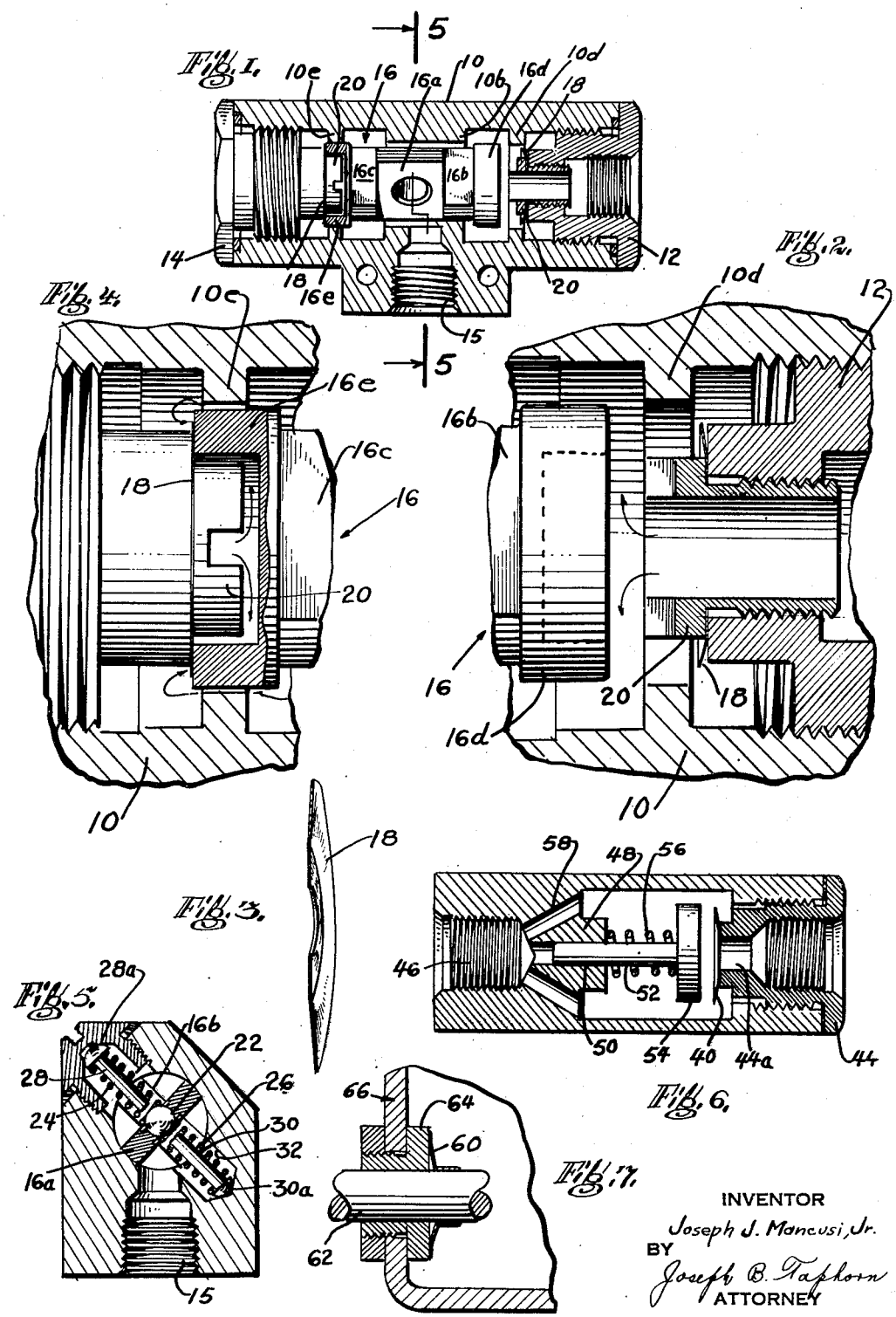

2,946,552
SEALING ELEMENTS

Joseph J. Mancusi, Jr., Eastchester, N.Y., assignor to Altair Inc., Terryville, Conn., a corporation of New York Filed Oct. 5, 1955, Ser. No. 538,560

5 Claims. (Cl. 251—175)

This invention relates generally to sealing elements and more particularly to sealing elements which can withstand both high pressures and high temperatures.

An object of this invention is to provide high pressure seals which are reliable and very effective and also possessed of long life and yet are easy of construction and inexpensive of manufacture.

Another object of the invention is to provide valve sealing elements which are effective over a wide range of pressures, for example, from zero through 5000 and higher p.s.i.

Another object of the invention is to provide a valve construction wherein destructive forces tending to carry the sealing elements downstream are reduced to a minimum.

According to the invention, a flexible thin disc sealing element, formed of metal or like material and slightly dished so as to constitute substantially the frustrum of a cone, is mounted about the low pressure port, usually the downstream side in a valve. A movable element, for example, a valve shuttle, generally presenting a flat surface to the outer or peripheral areas of disc sealing element, cooperates with the latter to prevent fluid flow when contact occurs. A positive seal is obtained because once fluid flow into the outlet port is reduced by the initial contact between the approaching shuttle and the outer edges of the disc sealing element, a pressure differential arises in which the higher pressure about the shuttle and the disc collapses the latter upon the former to provide inboard surface contact over a wide area. The nature of the metal disc is such as to allow deformation permitting it to conform with the element with which it effects a seal. A feature of this invention is that the metal disc may be formed of such thinness as to enable it to deform under relative light loads, yet its employment is also such as to prevent its destruction under the greatest of pressures. Its metallic nature assures its indestructibility at the high temperatures normally destructive of organic materials such as rubber, etc.

The sealing disc is dished ever so slightly. Being formed of metal or like material, it is sufficiently flexible so that immediately after initial contact at the outer edge, flat contact occurs over a substantial inboard area to effect perfect fluid seal. In fact, another feature of the invention is that perfect seal may be obtained with a shuttle having a relatively rough engaging surface and a disc sealing element whose outer or peripheral edge only substantially makes contact over its entire distance with the approaching shuttle, as once a pressure differential is created, sealing pressures will immediately arise, effecting sudden and complete cutoff.

The invention has been shown in two embodiments. In one embodiment, an ordinary three-ported shuttle valve is disclosed having an intermediately located common or outlet port and two end or inlet ports about which the disc sealing elements are mounted. In the second embodiment, the invention is shown as embodied in a check valve. Here the disc sealing element may be said to be mounted about the high pressure inlet port; nevertheless, the fluid flow sought to be avoided is the back flow and the sealing element is thus so employed as to prevent any back flow while readily facilitating forward flow.

These and other objects, features, and advantages of the invention will become apparent from a reading of the following detailed description when considered with the accompanying drawings, which disclose by way of example two preferred embodiments of the invention.

In the drawings:

Fig. 1 is a vertical, longitudinal sectional view through a three-ported shuttle valve constructed according to the invention.

Fig. 2 is an enlarged view of the right-hand end of the valve shown in Fig. 1.

Fig. 3 is a perspective view of the disc sealing element of the invention.

Fig. 4 is an enlarged view showing a seal as it obtains at the left-hand end of the valve in Fig. 1.

Fig. 5 is a view taken along the section line 5—5 of Fig. 1.

Fig. 6 is a vertical, longitudinal sectional view showing the invention embodied in a check valve.

Fig. 7 is a vertical sectional view through another embodiment of the invention.

Referring more particularly to the embodiment shown in Figs. 1 to 5 of the drawings, a three-ported shuttle valve is disclosed as comprised of a body 10 threaded at each of its ends to receive end or inlet plugs 12 and 14 and at an enlarged intermediate block-shaped portion 10a to form an outlet port 15. Slidably mounted interiorly of the valve body for movement between the end plugs 12 and 14 is a shuttle generally indicated by the numeral 16. Upon the application of a higher pressure to one inlet plug than obtains at the other inlet plug, the shuttle will shift its position to seal off the other inlet while admitting the fluid from the one inlet plug to the common outlet port 15.

The shuttle 16 includes a central diametrically disposed portion 16a rounded at its edges so as to be seated on a centrally disposed bearing boss 10b formed in the body 10 and two end diametrically disposed portions 16b and 16c extending at right angles to the portion 16a and rounded at their edges so as also to be seated on the bearing boss 10b. Generally only one of these end portions is seated on the bearing boss 10b along with the portion 16a. It can be seen that the shuttle will at all times be stable radially and that free fluid flow may at all times take place along the shuttle toward the outlet port 15.

At each end, the shuttle carries sealing rings 16d and 16e. These sealing rings perform two functions. In addition to effecting a full and complete terminal seal at the end of movement of the shuttle towards a particular inlet port, they cooperate with additional bearing bosses 10d and 10e, respectively, to block temporarily fluid flow in the valve. This blocking of the fluid flow, while imperfect, is such as to enable the shuttle element to be carried to its opposite position. For example, when high pressure is brought to the inlet plug 14 with the shuttle 16 positioned as in Fig. 1, the pressure moves the shuttle to the right. The boss 10e prevents fluid escape until the boss 10d has been engaged by the opposite end of the shuttle. Thus, the shuttle will be completely driven fluid-wise to its opposite position.

The full and complete seal is effected at each terminal position of the shuttle by the engagement of the outer radial face of the corresponding ring with the dished disc sealing element 18 carried by the corresponding inlet plug. As particularly disclosed in Figs. 1–4, the sealing element is a metal disc dished to form the frustrum of a cone. Its inner edge is held on the end face of a cylindrical portion of the inlet plug by the head of a hollow retaining screw 20 seated therein. Thus the outer or peripheral end of a metal disc faces interiorly for abutting engagement with the radial face of the corresponding ring.

Once such abutting engagement is accomplished, a pressure differential arises between the fluid on the upstream side of the metal disc and that in the downstream or low pressure inlet side thereof. Thus, there immediately obtains a force tending to collapse the metal sealing element onto the corresponding ring. As particularly shown in Fig. 4, the force flattens the flexible disc onto the ring for a substantial distance from its outer edge to completely cut off fluid flow in spite of any irregularities which may exist on the engaging surfaces. As pressures build above the point where the metal cone is flattened by the face of the shuttle element, additional load applied by pressure acting on the shuttle element will be transferred through the inner portions of the thin metal sealing element directly to the associated solid end plug.

Additional stability of operation is obtained in the valve by embodying a detent mechanism such as that shown in Figs. 5 and 1. This detent mechanism, which urges the shuttle 16 to either terminal position once the dead center point is passed, is basically an unstable device which delivers its greatest force at either terminal position. It consists of a ball 22 seated in the shuttle central portion 16a and engaged on opposite sides thereof by two diametrically extending compression springs 24 and 26. These springs are mounted, respectively, on pins 28 and 30 having rounded heads 28a and 30a seated in the end of openings 32 extending radially from the body chamber. The pins 28 and 30 rock about their headed ends as the springs 24 and 26 follow the shuttle, and it can be seen that once the shuttle is moved past the midpoint by fluid force, the springs will exert forces increasingly effective to move the shuttle to its other terminal position and hold it there. It may be further observed that the use of opposed springs results in the application of balanced forces upon the shuttle; hence, no side loads are applied to the shuttle which would cause it to stick or otherwise give sloppy action during transfer.

Another embodiment of the invention is shown in Fig. 6. Here the flexible metal disc sealing element 40 is shown as embodied in a check valve. Such a valve may comprise a generally hollow body 42 threaded at one end to receive an inlet plug 44 and at its other end at 46 for connection to an outlet conduit (not shown). At an intermediate point 48, the body extends across the interior portion where it is longitudinally bored at 50 to slidably receive the stem 52 of a ring sealing element 54 which is biased towards the inlet hub 44 by a spring 56. Through flow is enabled by providing diagonally extending borings 58 through the interior portion 48 outwardly of the stem bore 50.

Reverse flow of fluid is prevented by the engagement of the stem mounted ring 54 with the dished metal disc 40 mounted about the aperture 44a in the inlet hub 44. This disc is secured as by welding to the interior end of the inlet hub 44 and so that its outer edge extends inwardly into the valve. Thus, whenever the downstream pressures rise to where reverse flow might take place, the flow through the inlet port will decrease to where the spring will move the radial face 54a of the ring 54 into engagement with the outer edges of the metal disc 40. Further rise in back pressure will collapse the metal disc onto the radial face of the ring to seal the upstream side completely off from the downstream side. Upon a subsequent reduction in pressure, the higher pressure in the inlet side of the valve will overcome the force of the spring 56 to force the ring 54 away from the metal disc 40 and again permit downstream flow.

Fig. 7 shows still another embodiment of the invention. In this embodiment, a metal dished disc 60 forms a bearing seal. It is fixed, as by welding, to a shaft 62 to cooperate with the inboard face of a bearing 64 mounted in the side wall of a container 66. When pressures build up in the container, they operate on the disc and shaft to move the latter outwards and flatten the disc on the shaft against the bearing 64. Hence, a leakproof container is obtained from a large pressure range while the sealing forces vary with the requirements.

While there have been shown and described and pointed out the fundamental novel features of the invention as applied to preferred embodiments, it will be understood that various omissions and substitutions and changes in the form and details of the devices illustrated and in their operation may be made by those skilled in the art, without departing from the spirit of the invention. It is the intention, therefore, to be limited only as indicated by the scope of the following claims.

What is claimed is:

1. In a valve, an outlet port, an apertured and flexible and thin and slightly dished element mounted about said port, and a solid element movable into engagement with said dished element to restrict the flow in said outlet port, said dished element being effective upon the relative increase of pressure in the upstream side of said outlet to collapse upon and increasingly engage said solid element over a substantial area internally from the dished element's edge.

2. In a valve, a body having an outlet port, an apertured and thin and slightly dished metal disc forming a seat and mounted about said outlet port so that its outer edge extends inwardly of said body, and a solid valve-head element presenting a radial face to said disc mounted in said body for movement into and out of engagement with said disc, said metal disc being sufficiently flexible to collapse upon and engage the radial face of said solid element over a substantial area internally from the disc's edge when the element is in engagement with it and a higher pressure obtains in the upstream side of said outlet port.

3. In a valve, a body having a portion provided with an outlet port, a part mounted in said body for movement towards and away from said port portion, a slightly dished element mounted on one of said portion and part, and an element presenting a radial face to the dished element mounted on the other of said portion and part, the one of the slightly dished element and element presenting a radial face mounted on said portion being provided with an aperture communicating the outlet port with the interior of the valve, the dished element being sufficiently flexible to collapse upon and engage the radial face over a substantial area internally from the dished element's edge when the elements are in engagement and a higher pressure obtains in the upstream side of the outlet port.

4. In a valve, a body having a portion provided with an outlet port, a part mounted in said body for movement towards and away from said port portion, a slightly dished element mounted on the adjacent face of one of said portion and part, and an element presenting a radial face to the dished element mounted on the other of said portion and part, the one of the slightly dished element and element presenting a radial face mounted on said portion being provided with an aperture communicating the outlet port with the interior of the valve, the dished element being sufficiently flexible to collapse upon and engage the radial face over a substantial area internally from the dished element's edge when the elements are in engagement and a higher pressure obtains in the upstream side of the outlet port and to transmit directly through solid contact the fluid pressure forces acting on said part to the body port portion when the dished element engages the radial face over all of its area.

5. For use in a fluid containing device having a port and a relatively movable part and a radial face about one of said port and part, a slightly dished disc to be mounted about the other of said port and part and engaged at its outer edge with said radial face to prevent fluid flow through said port, said disc being sufficiently flexible to collapse upon and engage said radial face over a substantial area internally from the disc's edge when said port and part engage each other during a relative change in pressure in said device.

References Cited in the file of this patent

UNITED STATES PATENTS

| | | |
|---|---|---|
| 1,514,233 | Searles | Nov. 4, 1924 |
| 1,671,139 | Wilson | May 29, 1928 |
| 1,679,779 | Oberhuber | Aug. 7, 1928 |
| 1,847,385 | Dengler | Mar. 1, 1932 |
| 2,192,339 | Wilson | Mar. 5, 1940 |
| 2,196,798 | Horstmann | Apr. 9, 1940 |
| 2,651,491 | Ashton | Sept. 8, 1953 |
| 2,661,753 | Stroop | Dec. 8, 1953 |
| 2,685,296 | Boosman | Aug. 3, 1954 |
| 2,696,967 | Wilson | Dec. 14, 1954 |
| 2,741,264 | Leonard | Apr. 10, 1956 |
| 2,747,834 | Meusy | May 29, 1956 |
| 2,786,645 | Ralston | Mar. 26, 1957 |

FOREIGN PATENTS

| | | |
|---|---|---|
| 2,846 | Great Britain | Oct. 29, 1870 |